United States Patent [19]

Billmann

[11] Patent Number: 5,630,686
[45] Date of Patent: May 20, 1997

[54] SUPPORT DEVICE WITH NUT ASSEMBLY

[75] Inventor: Peter Billmann, Nürnberg, Germany

[73] Assignee: Sukosim Sicherheitsmuttern Verbindungselemente GmbH & Co., Schrozberg, Germany

[21] Appl. No.: 458,204

[22] Filed: Jun. 2, 1995

[30] Foreign Application Priority Data

Jun. 3, 1994 [DE] Germany ............... 9409087 U

[51] Int. Cl.⁶ ........................ F16B 27/00
[52] U.S. Cl. ............. 411/112; 411/111; 411/113; 411/174
[58] Field of Search ............ 411/111, 112, 113, 411/174, 175, 553, 551, 550, 549, 432, 525, 526

[56] References Cited

U.S. PATENT DOCUMENTS

| | | | |
|---|---|---|---|
| 2,991,816 | 7/1961 | Harbison | 411/111 |
| 3,020,947 | 2/1962 | McKelney | 411/111 |
| 3,695,324 | 10/1972 | Gulistan | 411/111 |
| 4,348,140 | 9/1982 | Berhholz | 411/112 |
| 4,695,212 | 9/1987 | Berecz . | |

FOREIGN PATENT DOCUMENTS

| | | |
|---|---|---|
| 0444979 | 9/1991 | European Pat. Off. . |
| 1061097 | 3/1967 | United Kingdom . |

Primary Examiner—Rodney M. Lindsey
Assistant Examiner—Fredrick Conley
Attorney, Agent, or Firm—Friedrich Kueffner

[57] ABSTRACT

A support device includes a nut having a neck-like retainer for a screw, wherein the neck-like retainer is provided with a radial projection. A support member having a stirrup-shaped cross section engages over the radial projection of the neck-like retainer. The neck-like retainer extends with play through an opening of the support member. A support collar is releasably mounted on the radial outer circumference of the neck-like retainer of the nut. The support collar extends over a cross-member of the support member on the side facing away from the radial projection of the neck-like retainer.

9 Claims, 3 Drawing Sheets

1

SUPPORT DEVICE WITH NUT ASSEMBLY

BACKGROUND OF THE INVENTION

1. Field of the Invention

The invention relates to a support device for a nut, wherein the support device has a neck-like retainer for a screw, and wherein the neck-like retainer is provided with a radial projection. The support device includes a support member for the nut, wherein the support member extends in the manner of a stirrup over the radial projection of the neck-like retainer and wherein the neck-like retainer extends through the support member with play.

2. Description of the Invention

As is well known, support devices of this type are used for so-called cage nuts. A cage nut is a part of a screw and nut connection by means of which components to be mounted are secured to an abutment. In order to simplify the assembly, the cage nut is preassembled on the abutment by means of the support member in the area of the opening of the abutment intended for the screw bolt. For this purpose, the support member is securely connected to the abutment and, in the assembled position, engages over the nut which is loosely arranged in the interior of the support member. When the screw bolt is later screwed into the nut thread, the support member provides a non-rotating support for the radial projection provided on the nut. Simultaneously, the support member prevents yielding of the nut in axial direction of the screw bolt. Accordingly, the screw bolt can be screwed into the nut without having to fix the nut manually or with the aid of appropriate tools.

In order to be able to compensate for assembly tolerances and/or to make it possible that the screw bolt can change its position even after the assembly, for example, under the influence of stresses or expansions occurring in the mounted component, the nut is held with play in the support member. Consequently, a gap remains between the radial outer circumference of the neck-like screw retainer of the nut and the wall of the opening of the support member provided for the screw retainer. Consequently, when the known support devices are used, there is the danger that, when the screw bolt is screwed in, the nut preassembled by means of the support member on the respective abutment carries out a tilting movement relative to the axial direction of the neck-like screw retainer. The tilting movement of the nut makes it more difficult, if not entirely impossible, to screw the screw bolt coaxially with the internal thread of the nut. Moreover, when using the known support devices, it is not possible to supply the support device and the nut as a structural unit to the location of assembly. Rather, for preparing for the assembly, the two components must be assembled at the location of assembly.

SUMMARY OF THE INVENTION

It is the object of the invention to provide a support device whose support member can be connected to the corresponding nut for the transportation to the location of assembly and for simplifying the preassembly operations.

In accordance with the invention, this object is met, in a support device of the above-mentioned type, by providing a support collar which is releasably supported on the radial outer circumference of the neck-like retainer of the nut, wherein the support collar engages over the support member on the side facing away from the radial projection of the neck-like retainer. For the preliminary connection of the support member and the nut, initially the nut with its neck-like retainer for the screw is passed through the opening of the support member provided for this purpose. Subsequently, the support collar can be placed on the neck-like retainer from the side located opposite the radial projection of the neck-like retainer. In doing so, the support collar is advantageously positioned on the neck-like retainer in such a way that as small a distance as possible in axial direction of the neck-like retainer remains between the radial projection of the neck-like retainer on one side of the support member and the support collar on the oppositely located side of the support member. Since, in this arrangement, the radial projection of the neck-like retainer, on the one hand, and the support collar, on the other hand, engage over the support member immediately adjacent to the support member, the angle of the tilting movement of the nut relative to the axial direction of the neck-like screw retainer is minimized. Consequently, a tilting yielding movement of the nut is essentially prevented when the screw bolt is screwed into the nut. Simultaneously, the slidability of the nut within the support member in a plane extending radially relative to the neck-like retainer is not impaired. As a result of the releasable fixing of the support collar to the neck-like retainer, the nut can be tightened in axial direction of the neck-like retainer against the abutment of the screw and nut connection by screwing the screw bolt into the nut thread.

A preferred embodiment of the support device according to the invention is distinguished by the fact that the support collar is supported on the radial outer circumference of the neck-like retainer of the nut in a releasable and clamping manner. This measure makes it possible to connect the support member and the nut without problems and quickly even before they are shipped to the location of assembly.

In an advantageous further development of the invention, the support collar has a support ring which concentrically and at a radial distance surrounds the neck-like retainer, wherein the support ring is supported in a clamping manner on the neck-like retainer by means of spring tongues resting against the outer circumference of the neck-like retainer. Such a support collar can be mass-produced easily.

A similar advantage is achieved by a preferred embodiment of the support device according to the invention in which the support collar is an elastic ring through which the neck-like retainer extends. The elastic ring can be manufactured, for example, as a punched part. Moreover, the elastic ring surrounds with tight contact the neck-like screw retainer which has a slightly greater dimension than the ring opening. Simultaneously, the elastic ring can be constructed in such a way that it covers without interruption the gap remaining between the neck-like retainer of the nut and the opening of the support member. In that case, the elastic ring slid onto the neck-like screw retainer tightly seals the annular gap between the neck-like retainer and the support member. The use of such an embodiment of the support device according to the invention is recommended, for example, in cases in which, at the conclusion of the assembly operations, the area surrounding the support device and the support member of the support device itself are painted. In that case, the support collar constructed as an elastic ring serves as a block which prevents the penetration of paint into the interior of the support member.

The support collar advantageously rests against the support member through a support sleeve which lines the opening of the support member. As a rule, the opening for the neck-like screw retainer of the nut is punched out of the respective surface of the support member. Depending, for example, on the material of the support member, this frequently results in uneven punched edges. These uneven edges are compensated by means of the support sleeve, and an opening with the desired cross-sectional shape is achieved. Moreover, the play of the neck-like screw retainer in the radial direction can be influenced by the wall thickness of the support sleeve.

A further development of the invention provides that the support collar and possibly the support sleeve are of an electrically non-conductive material. As a result of this measure, the nut is insulated in the paint bath against a current flow. Consequently, the nut does not accept the paint or the paint flows out of the thread of the nut when the support device, or the component on which the support device is mounted, is taken out of the paint bath. Accordingly, rethreading of the nut thread which might otherwise become necessary is not required in the case of the support device according to the invention.

Another preferred embodiment of the support device according to the invention is distinguished by the fact that the support collar and possibly the support sleeve are of synthetic material. As synthetic material components, the support collar and the support sleeve can be easily and inexpensively manufactured according to the injection molding process. Moreover, it is possible to select as materials for the aforementioned components synthetic materials which are adapted in their material properties to the conditions prevailing in the area of the location of assembly. In the event that the area of the location of assembly is painted following the assembly, paint-rejecting synthetic materials are available whose use prevent gluing of the support collar to the support sleeve which lines the opening of the support member. In addition, the above-described electrical insulation of the nut relative to the support member can be realized by using support collars and support sleeves of synthetic material.

For securing the support collar to the neck-like retainer, a radial protrusion is provided on the neck-like retainer, wherein the radial protrusion is axially spaced from the radial projection. The radial protrusion prevents unintentional sliding of the support collar from the neck-like retainer.

In the following, the invention will be explained in more detail with the aid of schematic illustrations of embodiments. In the drawing:

FIG. 2b is a side view of the cage nut of FIG. 2a;

FIG. 3b is a side view, partially in section, of the cage nut of FIG. 3a.

Figure 1A:
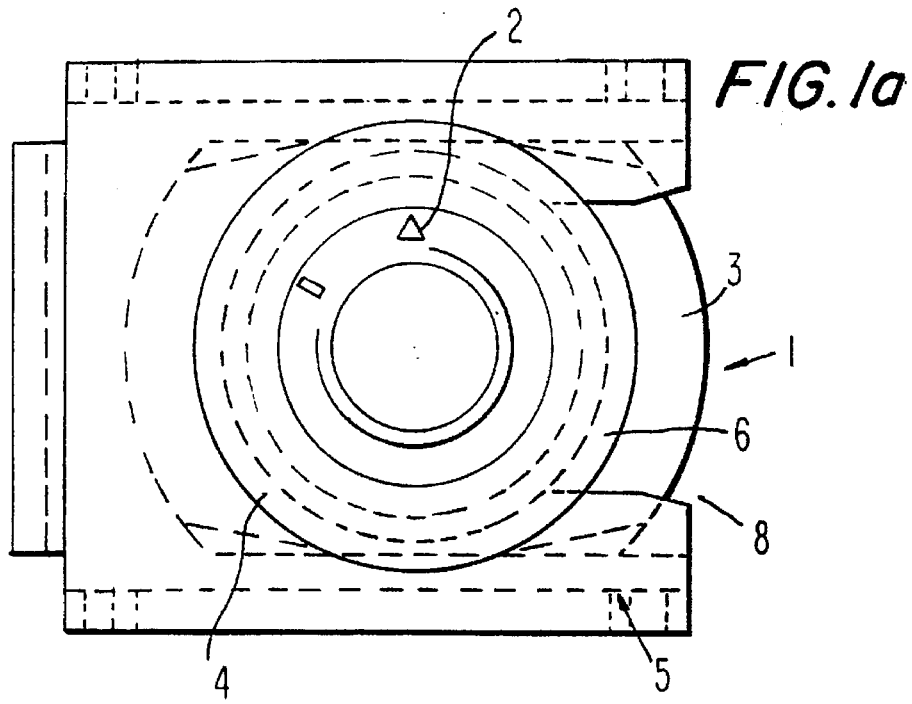
FIG. 1a is a top view of a cage nut with a support ring of synthetic material.
Figure 1B:
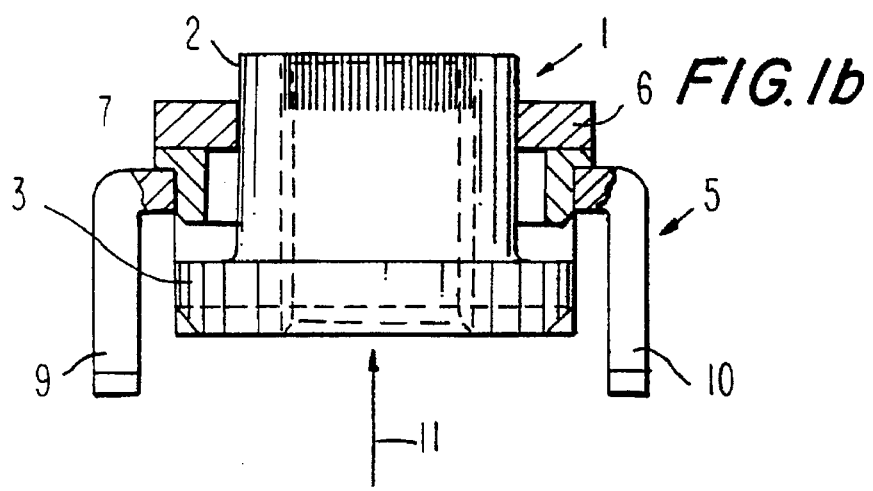
FIG. 1b is a side view, partially in section, of the cage nut of FIG. 1.
Figure 1C:
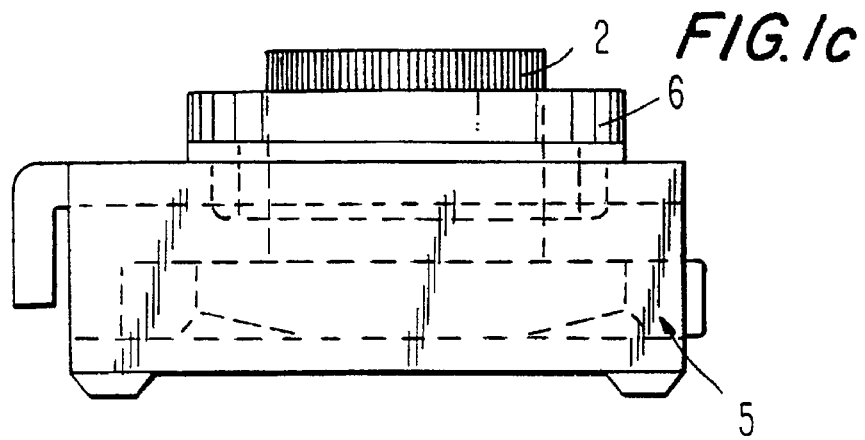
FIG. 1c is another side view of the cage nut according to FIGS. 1a and 1b.

FIGS. 1a to 1c illustrate a nut constructed as a cage nut 1 with a neck-like retainer 2 for a screw bolt. A radial projection in the form of a flange 3 projects beyond one end of the neck-like retainer 2.

DESCRIPTION OF THE INVENTION

The cage nut 1 extends with its neck-like retainer 2 through a punched-out opening 4 in a support member 5 which has a stirrup-like cross-section. On the side of the support member 5 facing away from the flange 3, the neck-like retainer 2 of the cage nut 1 is surrounded by a support collar in the form of a support ring 6 of synthetic material. Compared to the opening of the support ring 6 of synthetic material, the neck-like retainer 2 has a slightly greater dimension. Consequently, the support ring 6 of synthetic material is held in an elastically clamping manner on the radial outer circumference of the neck-like retainer 2 and the cage nut 1 can rest on the support member 5 in axial direction of the neck-like retainer 2 through the support ring 6 of synthetic material. Serving as the abutment for the support ring 6 of synthetic material is a support sleeve 7 of synthetic material which lines the wall surface of the punched-out opening 4 of the support member 5.

For preliminarily fixing the cage nut 1 to the support member 5, the cage nut 1 is initially inserted with its neck-like retainer 2 and perpendicularly to its axial direction through an insertion block 8 of the support member 5 provided in the punched-out opening 4 of the support member 5. Subsequently, the support sleeve 7 of synthetic material is pressed concentrically with the neck-like retainer 2 into the punched-out opening 4 of the support member 5. In the assembled position, the support sleeve 7 of synthetic material surrounds the neck-like retainer 2 with radial play. On the one hand, the support sleeve 7 of synthetic material prevents a contact of metal on metal which would occur if the cage nut 1 of metal is displaced in radial direction of the neck-like retainer 2 against the support member 5 which is also made of metal. Simultaneously, the support sleeve 7 of synthetic material serves as a lining for the punched edge of the opening 4 which is usually uneven.

After pressing the support sleeve 7 of synthetic material into the punched-out opening 4 of the support member 5, the support ring 6 of synthetic material is subsequently slid onto the neck-like retainer 2. The cage nut 1 is now secured to the support member 5 in axial direction as well as with play in radial direction of the neck-like retainer 2. The resulting structural unit of cage nut 1 and support member 5 can be supplied in this form to the location of assembly. The positive engagement between the cage nut 1 and the support member 5 ensures that the two components do not become separated from each other during the transport. The cage nut 1 is electrically insulated relative to the support member 5 because the use of the support sleeve 7 of synthetic material and the support ring 6 of synthetic material prevents a direct contact between the cage nut 1 and the support member 5 and because the support sleeve 7 as well as the support ring 6 are manufactured of an electrically non-conductive material. When the support member 5 as well as the cage nut 1 are mounted, for example, on a part of an automobile body to be painted, the cage nut 1 either does not accept any paint during painting according to the method in the paint bath used in automobile manufacture, or the paint flows at least out of the thread of the cage nut 1 when the automobile part is removed from the paint bath. Accordingly, rethreading of the nut thread for removing any paint deposited in the thread is unnecessary.

The structural unit illustrated in FIGS. 1a through 1c serves as a connecting element for fixing motor vehicle engines in the engine space. Oblong holes are provided in the reinforced body parts which define the engine space of the automobile, wherein screw bolts of fastening screws resting against appropriate abutments of the engine block are inserted through the oblong holes from the side of the engine space. The structural unit composed of cage nut 1 and support member 5 is mounted on the side of the reinforced body part which faces away from the engine space. For this purpose, the support member 5 is placed so as to extend over the oblong hole of the reinforced body part and the legs 9, 10 of the support member 5 are welded to the reinforced body part. Flange-like angles can be provided at the legs 9, 10, wherein the angles produce a relatively large contact surface with the body part. After the support member 5 is welded on, the respective fastening screw is turned from the side of the engine space in the direction of arrow 11 into the neck-like retainer 2 of the cage nut 1. When the screw head of the fastening screw has made contact with its axial stop, a continuation of the rotation of the screw bolt has the result that the cage nut 1 is pulled against the reinforced body part against the direction of arrow 11 and the cage nut 1 is secured to the body part. When the screw bolt is screwed in, the internal surfaces of the legs 9, 10 provide a non-rotating abutment for the flange 3 of the cage nut 1, and thus, prevent the cage nut 1 from rotating together with the screw bolt. Stresses on the engine block resulting from the assembly and/or expansions resulting, for example, from temperature changes of the engine block, can be compensated by the play existing between the cage nut 1 and the support member 5 engaging over the cage nut 1. Since the support ring 6 as well as the support sleeve 7 are both made of paint-rejecting synthetic material, it is ensured that both components do not become glued to each other during the painting operations following the assembly of the engine block. Since the support ring 6 of synthetic material which surrounds the neck-like retainer 2 of the cage nut 1 seals the annular space remaining between the radial outer wall of the neck-like retainer 2 and the support sleeve 7 of synthetic material, it is prevented that paint can penetrate into the interior of the support member 5.

Figure 2A:
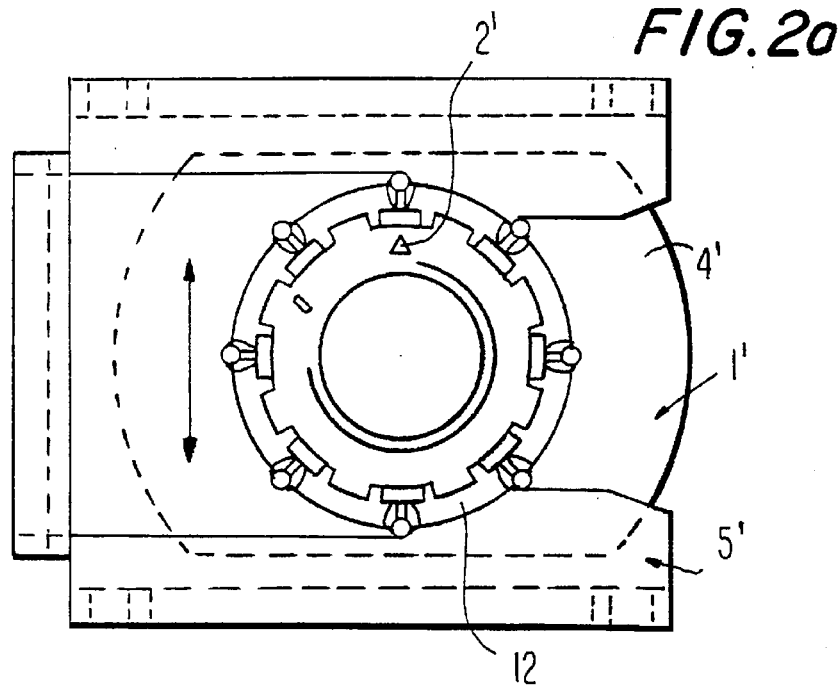
FIG. 2a shows a cage nut with a crown-like support ring.
Figure 2B:
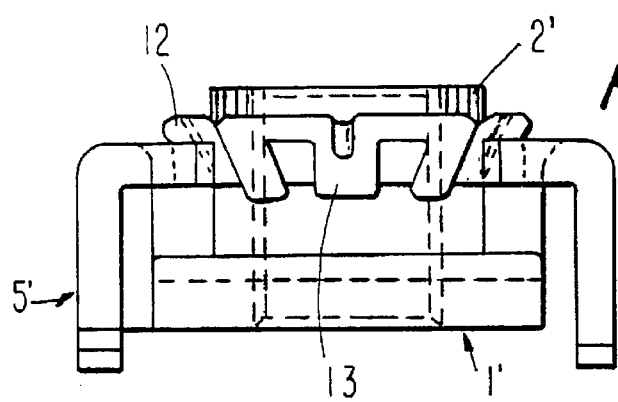
Figure 2C:
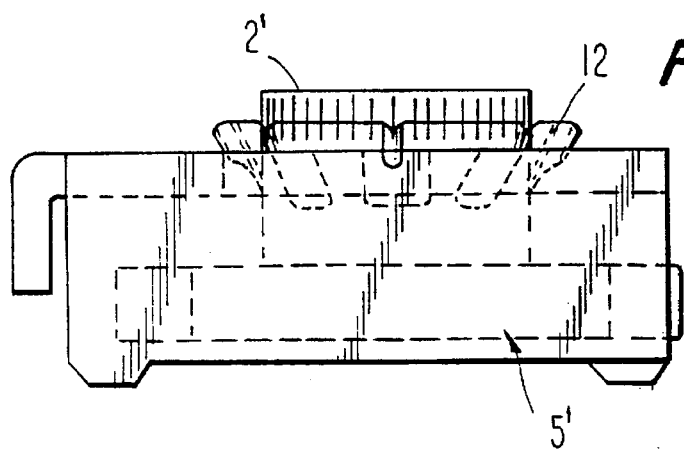
FIG. 2c is another side view of the cage nut according to FIGS. 2a and 2b.

FIGS. 2a through 2c show a cage nut 1' and a support member 5' which essentially correspond to the components illustrated in FIGS. 1a through 1c. For preliminarily fixing the cage nut 1' to the support member 5', a crown-like support ring 12 made of spring steel is used as the support collar instead of a support ring 6 of synthetic material. The support ring 12 rests through spring tongues 13 on the radial outer circumference of the neck-like retainer 2' of the cage nut 1'. A lining of the punched-out opening 4' of the support member 5' is not provided.

Figure 3A:
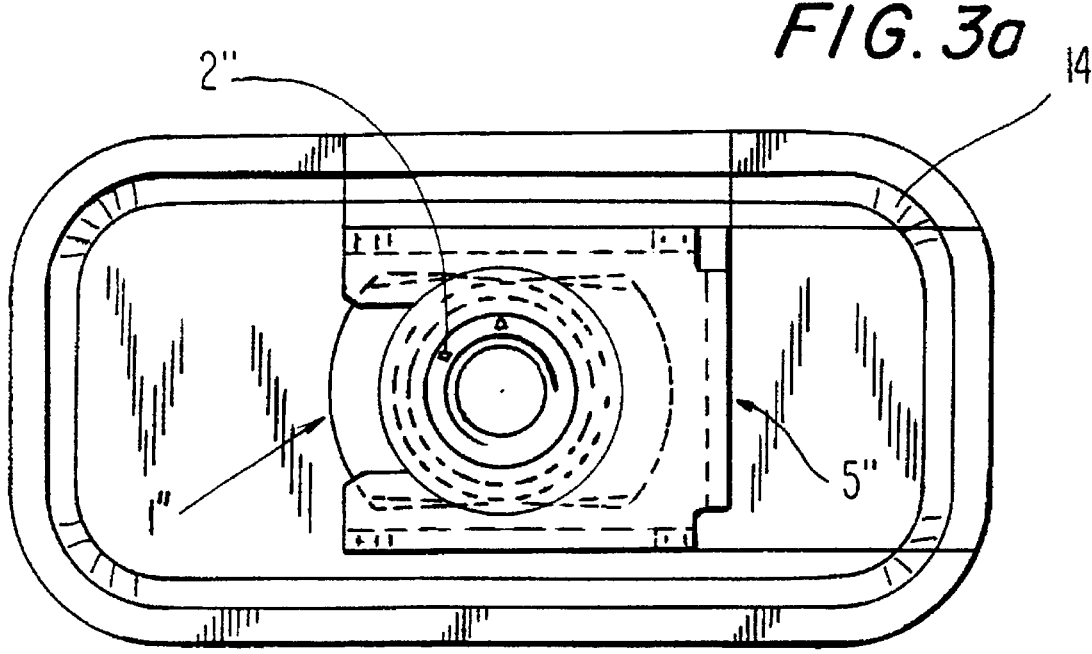
FIG. 3a shows a cage nut with a support member with a base plate.
Figure 3B:
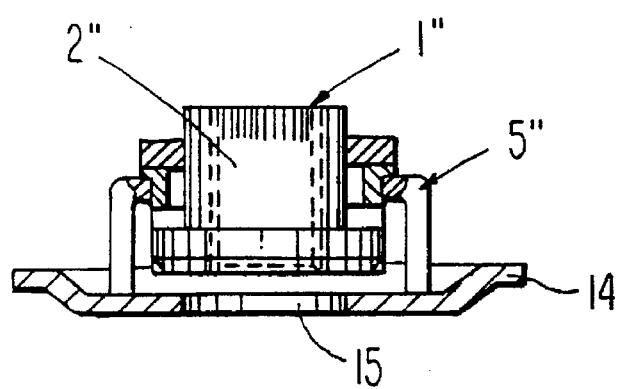

FIGS. 3a and 3b show a cage nut 1" which is preliminarily secured to a support member 5" through a neck-like retainer 2". The support member 5" is welded to a base plate 14 which has an opening for the screw bolt which is in alignment with the threaded bore of the neck-like retainer 2". The entire structural unit is welded to the respective body part on the base plate 14. The components illustrated in FIGS. 3a to 3b otherwise correspond to the components of FIGS. 1a through 1c and 2a through 2c.

I claim:

1. A support device comprising a nut, the nut having a neck-like retainer for a screw, the neck-like retainer having a radial outer circumference and being provided with a radial projection, and a support member for the nut, the support member having a stirrup-shaped cross section, the support member comprising two legs and a cross-member connecting the two legs to one another, wherein the cross-member of the support member engages over the radial projection of the neck-like retainer, and wherein the neck-like retainer extends with play through an opening of the support member, a support collar being supported in radial direction directly on the radial outer circumference of the neck-like retainer of the nut whereby the support collar is mounted releasably and in a clamping manner on the radial outer circumference of the neck-like retainer, wherein the support collar extends over the cross-member of the support member on a side facing away from the radial projection of the neck-like retainer.

2. The support device according to claim 1, wherein the support collar comprises a support ring, the support ring concentrically surrounding at a radial distance the neck-like retainer, wherein the support ring is connected in a clamping manner in axial direction to the neck-like retainer by means of spring tongues, and wherein the spring tongues rest in radial direction directly on the outer circumference of the neck-like retainer.

3. The support device according to claim 1, wherein the support collar is a ring which is elastic in radial direction, and wherein the neck-like retainer extends through the ring.

4. The support device according to claim 1, wherein the support collar rests against the support member through a support sleeve, and wherein the support sleeve lines the opening of the support member.

5. The support device according to claim 1, wherein the support collar is of an electrically non-conductive material.

6. The support device according to claim 1, wherein the support collar rests against the support member through a support sleeve, wherein the support sleeve lines the opening of the support member, and wherein the support collar and the support sleeve are of an electrically non-conductive material.

7. The support device according to claim 1, wherein the support collar is of synthetic material.

8. The support device according to claim 1, wherein the support collar rests against the support member through a support sleeve, wherein the support sleeve lines the opening of the support member, and wherein the support collar and the support sleeve are of synthetic material.

9. The support device according to claim 1, wherein the neck-like retainer comprises a radial protrusion located at an axial distance from the radial projection.

* * * * *